US008738769B1

(12) United States Patent
Mongiovi (10) Patent No.: US 8,738,769 B1
(45) Date of Patent: *May 27, 2014

(54) METHOD, SYSTEM, AND STORAGE MEDIUM FOR COLLECTING SNMP BANDWIDTH DATA (71) Applicant: Open Invention Network LLC, Durham, NC (US)

(72) Inventor: Roy Mongiovi, Tucker, GA (US)

(73) Assignee: Open Invention Network, LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 13/646,956

(22) Filed: Oct. 8, 2012

Related U.S. Application Data (63) Continuation of application No. 13/338,385, filed on Dec. 28, 2011, now Pat. No. 8,285,847, which is a continuation of application No. 13/080,905, filed on Apr. 6, 2011, now Pat. No. 8,127,006, which is a continuation of application No. 12/414,557, filed on Mar. 30, 2009, now Pat. No. 7,937,466, which is a continuation of application No. 11/842,646, filed on Aug. 21, 2007, now Pat. No. 7,631,075, which is a continuation of application No. 10/643,407, filed on Aug. 18, 2003, now Pat. No. 7,260,630.

(51) Int. Cl.
G06F 11/00 (2006.01)

(52) U.S. Cl.
USPC ............... 709/224; 714/11; 714/13; 713/600

(58) Field of Classification Search
USPC ............... 709/224, 223, 203; 714/11, 13, 4.1; 713/600
See application file for complete search history.

(56) References Cited

U.S. PATENT DOCUMENTS

| | | | | |
|---|---|---|---|---|
| 6,460,055 B1* | 10/2002 | Midgley et al. | ................ | 707/640 |
| 6,502,125 B1* | 12/2002 | Kenner et al. | ................ | 709/203 |
| 6,526,418 B1* | 2/2003 | Midgley et al. | ................ | 707/640 |
| 6,587,432 B1* | 7/2003 | Putzolu et al. | ................ | 370/229 |
| 6,625,623 B1* | 9/2003 | Midgley et al. | ................ | 707/640 |
| 6,985,944 B2* | 1/2006 | Aggarwal | ................ | 709/224 |
| 7,203,176 B2* | 4/2007 | Golikeri et al. | ................ | 370/254 |
| 7,260,630 B1* | 8/2007 | Mongiovi | ................ | 709/224 |
| 7,631,075 B2* | 12/2009 | Mongiovi | ................ | 709/224 |
| 7,801,130 B2* | 9/2010 | Sheppard et al. | ................ | 370/389 |
| 7,937,466 B2* | 5/2011 | Mongiovi | ................ | 709/224 |
| 8,127,006 B2* | 2/2012 | Mongiovi | ................ | 709/224 |
| 8,285,847 B1* | 10/2012 | Mongiovi | ................ | 709/224 |

* cited by examiner

*Primary Examiner* — Kenneth Coulter
(74) *Attorney, Agent, or Firm* — Haynes and Boone, LLP (57) ABSTRACT

A method, system, and storage medium for collecting bandwidth data is provided. The method includes producing master and slave text files in response to simultaneous collection of data samples from a network device by servers. The method also includes generating a clean data file by sorting data in the master and slave text files by the network device port, sorting data samples for the port by collection time, and for each of the samples: adding a designated interval of time to a time on the network device resulting in a target network device time whereby the time on the network device corresponds to a time the data sample was collected, examining data samples in the master and slave text files corresponding to the time the respective data samples were collected, selecting from one of the master and slave text files the sample with a collection time most closely matching the target network device time, and storing the selected sample in the clean data file.

20 Claims, 6 Drawing Sheets

FIG. 1

```
                206
                (    210                    216
 202    204    \208 /          214         (
  )      \      ) )  /   212    (
1057078500,bss00atl,6,25,0,4029865080,0,4029865080
1057078500,bss00atl,6,26,0,4029865080,0,4029865080
1057078500,bss00atl,6,27,0,4029865080,0,4029865080
1057078500,hrs0eatl,6,1,0,2349289072,0,2349289072
1057078500,bss00atl,6,28,0,4029865080,0,4029865080
1057078500,hrs0eatl,6,2,0,2349289072,0,2349289072
1057078500,bss00atl,6,29,0,4029865080,0,4029865080
1057078500,hrs0eatl,6,3,0,2349289072,0,2349289072
                    *
                    *                              5 MINUTE
                    *                              INTERVAL 1057078500,bss00atl,6,20,0,4029865080,0,4029865080
1057078500,bss00atl,6,21,0,4029865080,0,4029865080
1057078500,bss00atl,6,22,0,4029865080,0,4029865080
1057078500,bss00atl,6,23,0,4029865080,0,4029865080
1057078500,bss00atl,6,24,0,4029865080,0,4029865080

1057078500,bss00atl,1,1,21658569386232,4029894782,259154417765719,4029894782
1057078500,bss00atl,1,2,987492443140,4029894782,130889375955323,4029894782
1057078500,bss00atl,15,1,3626280411,4029894782,0,4029894782
1057078500,bss00atl,3,1,267462255790100,4029894782,6588215188433,4029894782
1057078500,bss00atl,3,2,66,4029894782,66,4029894782
1057078500,bss00atl,3,3,1314393,4029894782,66,4029894782
1057078500,bss00atl,3,4,13255257446409,4029894782,2732623491216,4029894782      5 MINUTE
                    *                                                           INTERVAL
                    *
                    *
1057078500,hrs13atl,9,48,52552836968,3890892546,1311625801,3890892546
1057078500,hrs13atl,2,1,3534658483,3890892546,783485301,3890892546
1057078500,hrs13atl,2,2,967,3890892546,967,3890892546
```

METHOD, SYSTEM, AND STORAGE MEDIUM FOR COLLECTING SNMP BANDWIDTH DATA

CROSS-REFERENCE TO RELATED APPLICATIONS

The present application is a continuation of U.S. patent application Ser. No. 13/338,385, filed Dec. 28, 2011, now U.S. Pat. No. 8,285,847, which is a continuation of U.S. patent application Ser. No. 13/080,905, filed Apr. 6, 2011, now U.S. Pat. No. 8,127,006, which is a continuation of U.S. patent application Ser. No. 12/414,557, filed Mar. 30, 2009, now U.S. Pat. No. 7,937,466, which is a continuation of U.S. patent application Ser. No. 11/842,646, filed Aug. 21, 2007, now U.S. Pat. No. 7,631,075, which is a continuation of U.S. patent application Ser. No. 10/643,407, filed Aug. 18, 2003, now U.S. Pat. No. 7,260,630, the contents of which are incorporated by reference herein in their entirety.

BACKGROUND OF THE INVENTION

The present invention relates to network monitoring and management systems, and more particularly, the present invention relates to a method, system, and storage medium for collecting SNMP bandwidth data for a network device.

The present invention relates to network monitoring and management systems, and more particularly, the present invention relates to a method, system, and storage medium for collecting SNMP bandwidth data for a network device.

Many businesses today are transferring their network management activities to third parties, such as backbone providers, who are better skilled to build and maintain complex network configurations. Such activities include web hosting, VPN access, and other data transport activities, to name a few. These third parties often rely on Simple Network Management Protocol (SNMP) to track and monitor the network devices they host. SNMP is used to collect statistics from various types of network equipment. SNMP governs network management and the monitoring of network devices and their functions by sending messages to different parts of a network. SNMP-compliant devices, called agents, store data about themselves in Management Information Bases (MIBs) and return this data to the SNMP requesters. SNMP is based on user datagram protocol (UDP), which is an inherently unreliable protocol. As a result, current systems have not been capable of guaranteeing the capture of all data samples. Despite the use of timeouts and retransmissions, SNMP request and response packets are not guaranteed to arrive at their destination.

Backbone service providers require high quality data sampling of network devices in order to generate accurate bandwidth billing for these electronic business services. Raw data tracked from network devices is often inaccurate or incomplete. Consequently, these providers often lose a significant amount of their billing revenue.

What is needed, therefore, is a way to comprehensively track the SNMP data received from network devices.

SUMMARY OF THE INVENTION

Exemplary embodiments of the invention relate to a method, system, and storage medium for collecting bandwidth data is provided. The method includes producing master and slave text files in response to simultaneous collection of data samples from a network device by servers. The method also includes generating a clean data file by sorting data in the master and slave text files by the network device port, sorting data samples for the port by collection time, and for each of the samples: adding a designated interval of time to a time on the network device resulting in a target network device time whereby the time on the network device corresponds to a time the data sample was collected, examining data samples in the master and slave text files corresponding to the time the respective data samples were collected, selecting from one of the master and slave text files the sample with a collection time most closely matching the target network device time, and storing the selected sample in the clean data file.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

The data collection system of the invention is a network monitoring device that can be used for Ethernet, Token Ring, FDDI, and other suitable networks. It can monitor a single LAN or may be used in a distributed network with multiple complex LANs and WANs. Further, the data collection system tracks data from various types of SNMP-enabled devices and displays Web-based results. A network administrator of the data collection system can view network traffic in near real time, and resolve issues before they become disabling to the network. An alert system tracks the performance of the equipment monitoring the network devices and sends a message to a network administrator when the equipment is not responding.

The data collection system allows for two or more collecting servers to collect SNMP data samples and to use one server's data to repair gaps in the data collected by the other if any should occur. In theory, single values from one server's data could be plugged into the gaps in the other server's data. Because the two or more data collection servers are running with synchronized time-of-day clocks, they should be collecting data at precisely the same time. In practice, however, each of their system clocks will not be perfectly synchronized and the load on the servers will not be identical, so they will not retrieve SNMP information from the network devices being monitored at precisely the same time. Therefore, the gap between samples when switching from one server's data to a partner server's data will not produce an exact five-minute interval. The process of plugging the holes in one server's data with samples from the other server(s) essentially switches the data stream from one server to the other(s) and then immediately back, resulting in jitter that occurs twice for each gap filled in the five-minute sample—once upon switching over to the partner server, and again upon switching back to the original collecting server. The data collection system of the invention minimizes the occurrence of switching between servers, resulting in fewer incidences of jitter in the resultant bandwidth data.

Figure 1:
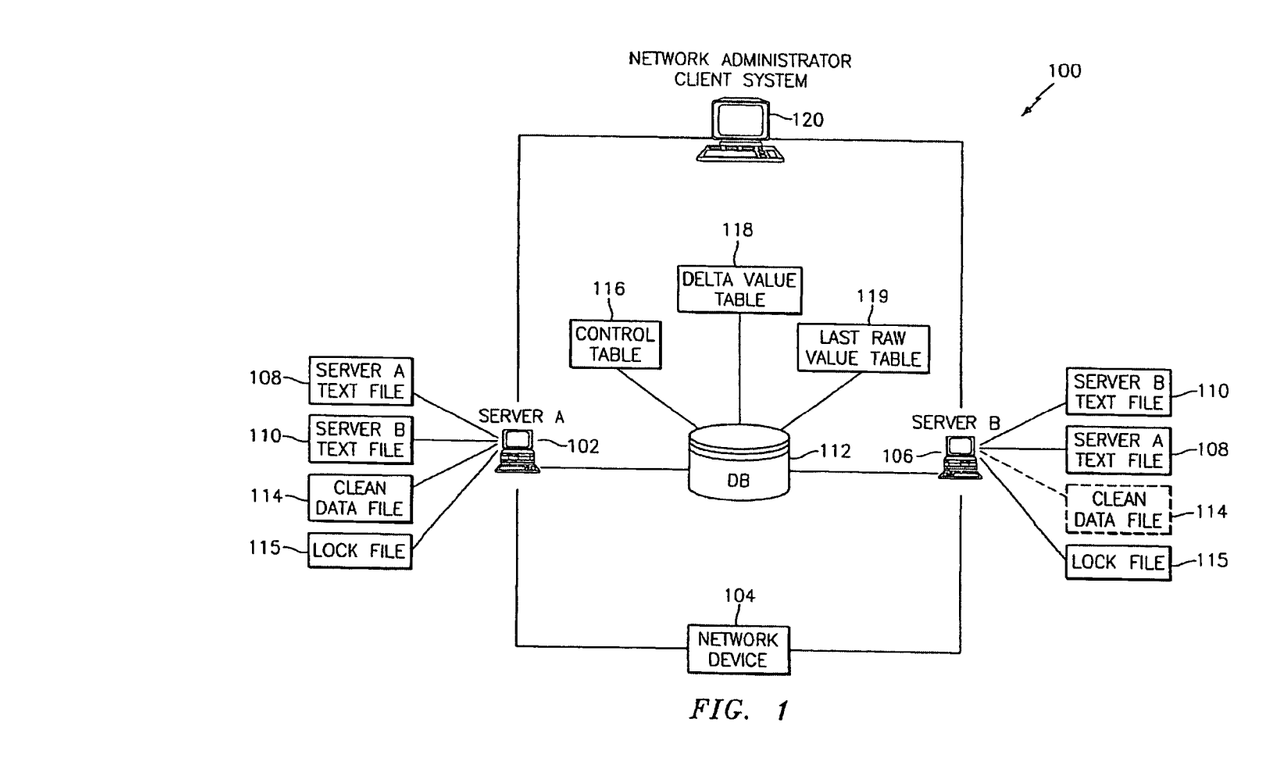
FIG. 1 is a block diagram of a system upon which the data collection system is implemented in an exemplary embodiment.

FIG. 1 illustrates a block diagram of a system upon which the data collection system of the invention is implemented. System 100 includes data collection servers 102 and 106 (also referred to as "collecting servers") that perform simultaneous data sampling of a network device 104 and store the data internally in text files 108 and 110, respectively. Servers 102 and 106 may comprise any suitable multi-processing devices typically used in a data-sampling environment. While the invention is described with respect to two servers, it will be understood by those skilled in the art that multiple servers may be utilized in the data sampling and bandwidth computation processes described herein.

Figure 2:
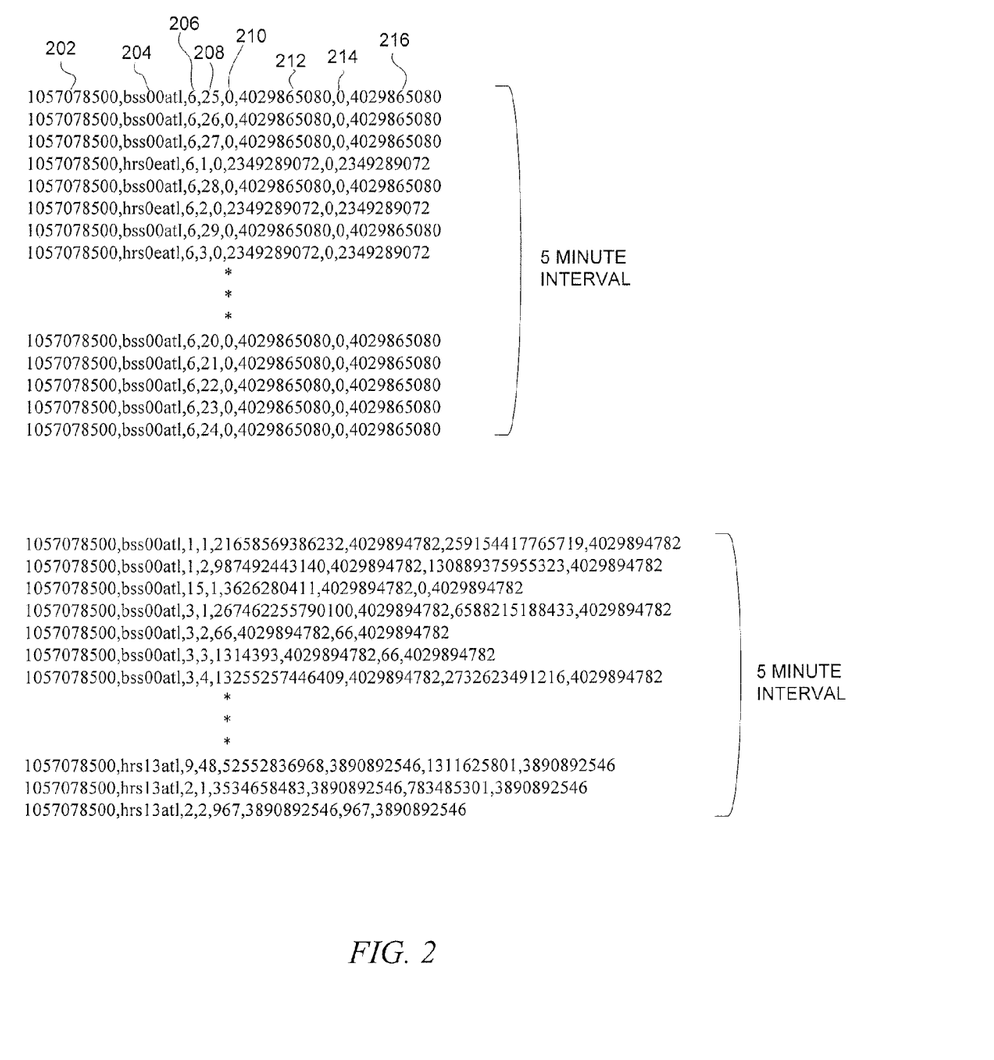
FIG. 2 is a sample text file comprising two 5-minute data samples collected from a network device.

A sample text file with sampling data is illustrated in FIG. 2. Text files 108 and 110 store raw data received from the data sampling activities, including collection times and dates, the identification of the device being monitored, and the number of bytes received and transmitted by the network device. The data in text file 108 have been collected via server A 102 and the data in text file 110 have been collected by server B 106. At a predetermined time, text file 110 is copied to server A 102 and text file 108 is copied to server B 106 as will be described further herein. The server charged with processing the raw data into clean data files is referred to herein as the "master" server, while the partner server (referred to herein as "slave" server), in an auxiliary capacity, performs little function unless the master server fails in its duties. For illustrative purposes, server A 102 is initially deemed the master server. It is important to note that the active server is also referred to as the "local" server, while the inactive server will be referred to as the "remote" server.

Computed delta values for the raw data collected in text files 108 and 110 are held in database 112. Computed delta values are described further herein. Database 112 is preferably a relational database utilizing a relational database management system (DBMS) for allowing data to be stored in the form of related tables and which allow the data to be viewed in a variety of ways. Database 112 further houses a control table 116, a delta value table 118, and a last raw value table 119, each of which is utilized by the data collection system. Control table 116 stores the name or identification of the server charged with updating database 112 (i.e., the master server) as well as the time of the hourly run by which the database was last updated. Delta value table 118 stores delta value computations of clean files produced by the data collection system. Last raw value table 119 stores the last raw data point for a previous text file that is used in computing the data in delta value table 118. This is described further herein.

Each of servers 102 and 106 also stores its own copy of a lock file 115 that is used to facilitate the serialization of hourly runs on each server. An hourly run refers to a completed text file that is awaiting or has completed computational processing. Because the slave server may have had to wait up to an hour to actually begin operation, and because of uncertainties regarding the speed of database 112 and the amount of time it takes for the hourly run to complete, the data collection system uses lock file 115 to ensure that the current hourly run has completed before the next hourly run is allowed to begin. Lock file 115 records the nominal time of each hourly process currently running along with its process ID. The lock file is maintained and sorted by nominal time, and only the process listed first in the file is allowed to run. As each hourly process completes on each of servers 102 and 106, it is removed from the respective lock files 115 and the next hourly process begins.

Figure 5:
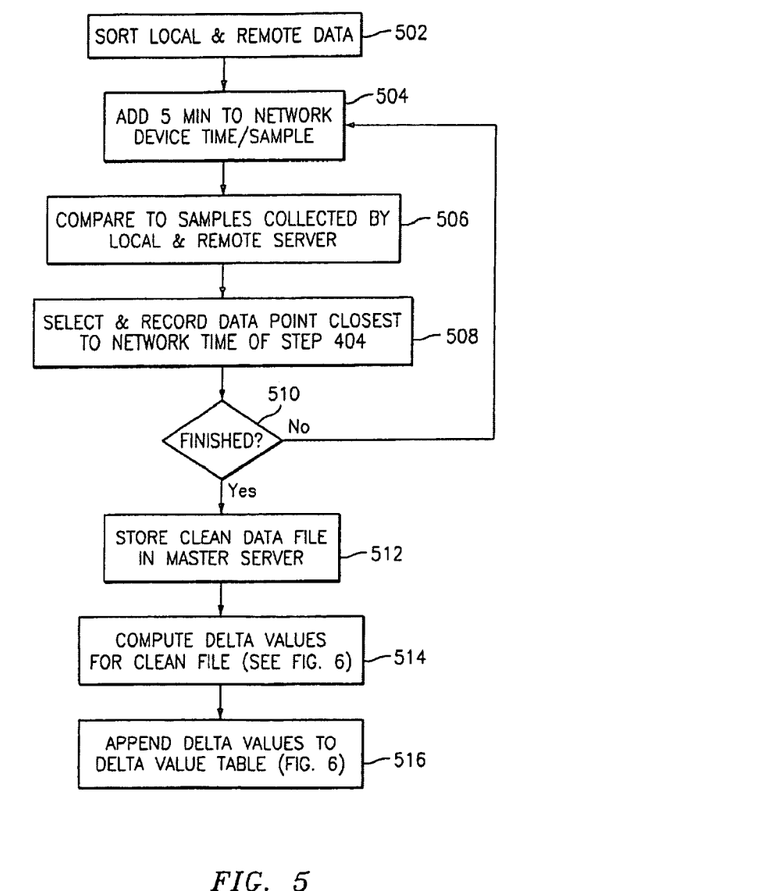
FIG. 5 is a flowchart describing the process of generating a clean data file via the data collection system in an exemplary embodiment.

Either of servers 102 and 106, when acting in the capacity of master server, will store a clean data file 114. Clean data file 114 is generated by reviewing the text file of the master server and filling in any missing information using information provided in the text file of the slave server. As described above, the master server refers to the server that is determined by the data collection system to have master control over the data computation process that occurs for each hourly run. A time stamp associated with the network system being monitored (see FIG. 2, fields 212 and 216) is provided in the text files to enable the data collection system to cross-reference the corresponding data samples between the text files. When the data collection system determines that the master server is not performing, the data collection system turns master control over to the slave server to continue processing data samples provided in the hourly run. By relinquishing master control only upon such malfunction, and by limiting the transfer of control between data collection servers, the integrity of the data collected can be maximized since there will be fewer offsets that are otherwise caused by incidences of jitter.

Network device 104 represents the device to be monitored. Network device 104 may include components generally associated with computer network architecture such as a router, a switch, a gateway, a hub, etc. Data is collected from each physical port on the network device. Although not necessary to realize the advantages of the invention, network devices are typically located remotely from data collection servers. Multiple network devices may be monitored utilizing the data collection system.

Servers 102 and 106 may be connected to network device 104 via any suitable communications link including wired or wireless technologies operable for receiving digital data. In a preferred embodiment, database 112 is stored in a data repository and exists independently of servers 102 and 106 and is logically addressable from servers 102 and 106.

Servers 102 and 106 perform simultaneous and redundant data sampling of network device 104, and the results are processed by the data collection system. As described above, the data collection system maintains one master server for directing and managing the computation processes but also possesses the intelligence to determine when to switch over to the remote server to avoid data loss. This intelligence ensures minimization of data error caused by jitter and system failures.

Data collection system also includes two independent alert and safety mechanisms that monitor the collection process and generate messages when necessary to minimize loss of data due to system malfunctions or data corruption. These alert mechanisms are further described herein.

Network administrator client system 120 refers to a computer device operated by a network administrator or other system specialist. A network administrator of the data collection system can view network traffic in near real time, and resolve issues before they become disabling to the network via an alert system. Client system 120 receives email or similar communications from servers 102 and 106 via the data collection system. These communications include alerts and error messages as described further herein.

The data collection method uses two or more servers each running an identical set of processes to provide a reliable, redundant data collection service. A process to sample bandwidth data via SNMP is run periodically (e.g., every five minutes on a five minute boundary) for each of the data collection servers retrieving the same data from the same set of network device. Data is collected from every physical port on each network device which is then appended to a text file. Each text file may comprise multiple sequential data samples (e.g., one hour's worth of five minute data sampling).

FIG. 2 illustrates a sample text file 200 comprising two 5-minute data samplings of a network device. The first field 202 of text file 200 indicates the time on the collecting server when the sample was gathered in standard UNIX time format (i.e., in seconds beginning Jan. 1, 1970). This is the nominal data collection time. That is, due to system load, etc., the data collection process started at 08:15:00 might not actually begin until 08:15:03. The time recorded in the text file would be 08:15:00, as this is the intended time of this sample.

Fields 204-208 indicate the name, module, and index (respectively) of the network device from which this data point was collected. Thus, fields 204-208 together describe a single physical port on a network device.

Field 210 indicates the number of bytes received on this port since the port's free-running counter was last reset. This may be expressed as a 64-bit unsigned integer. Field 212 represents the time on the network device at which the number of bytes from field 210 was sent.

Field 214 indicates the number of bytes transmitted on this port by this single connection, since the port's free-running counter was last reset. This may be expressed as a 64-bit unsigned integer. Field 216 refers to the time on the network device at which the number of bytes of field 214 was transmitted.

The data collection system uses the data in fields 202-216 to determine the number of bytes received and transmitted in the interval between data samples. This number is referred to herein as a "delta value" and is used to monitor network traffic and bandwidth use. Successive values from sampled data are subtracted for the same physical port in determining these delta values. Additionally, text files can be stored as standalone files or can be concatenated by the data collection system as described further herein.

Figure 3:
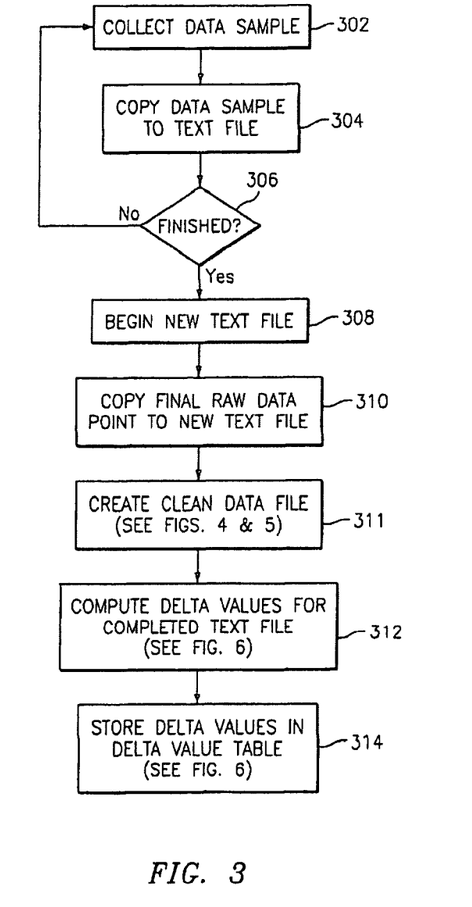
FIG. 3 is a flowchart describing a high-level view of the data collection and computation activities performed by the data collection system in an exemplary embodiment.

FIG. 3 describes a high-level view of the data sampling process and subsequent computations for determining bandwidth usage. A detailed description of how the data collection system generates a clean data file (step 311) is described in FIGS. 4 and 5, while a detailed description of the delta value computation process (step 312) is described in FIG. 6. At step 302, a data sample is collected simultaneously by servers 102 and 106 at a designated time period. The data sample is written to corresponding first text files 108 and 110, respectively, at step 304. Periodic samples continue to be collected at designated time intervals such as five-minute intervals. At step 306, the data collection process determines whether additional samples are to be collected for the text files. This will depend upon the interval of collection as well as the size of the text file. For illustrative purposes, each text file comprises five-minute samples for a sixty-minute duration (also referred to as an hourly run). If there are additional samplings needed for the text file at step 306, the process returns to step 302. If the text file is complete at step 306, the data collection process begins a new text file at step 308 and the process repeats.

The last raw data point from the first or previous text file is copied over to the new text file at step 310. Because it is possible that some ports were not sampled in the current run, step 310 is performed by scanning the current text file and recording the final sampled value for each port. For example, when a network device stops responding, the final values received from it are carried forward from one hourly run to the next. In order to prevent this from continuing ad infinitum, the values carried forward are discarded if they were collected more than 24 hours ago or more than some other designated time period. At step 311, a clean data file is generated by the data collection process utilizing the two completed text files. As indicated above, step 311 is described in further detail in FIGS. 4 and 5. At step 312, delta values for the data samples for the previous or completed raw text files are computed. The computational process of step 312 is described further in FIG. 6. By carrying over the last raw data point for each text file to the next text file, the data collection system allows for delta values to be computed for a completed text file without the need to access the entire previous text file. This feature also allows the text files to be concatenated for ongoing analysis of bandwidth usage. Computed delta values are stored in delta value table 118 at step 314.

Figure 4:
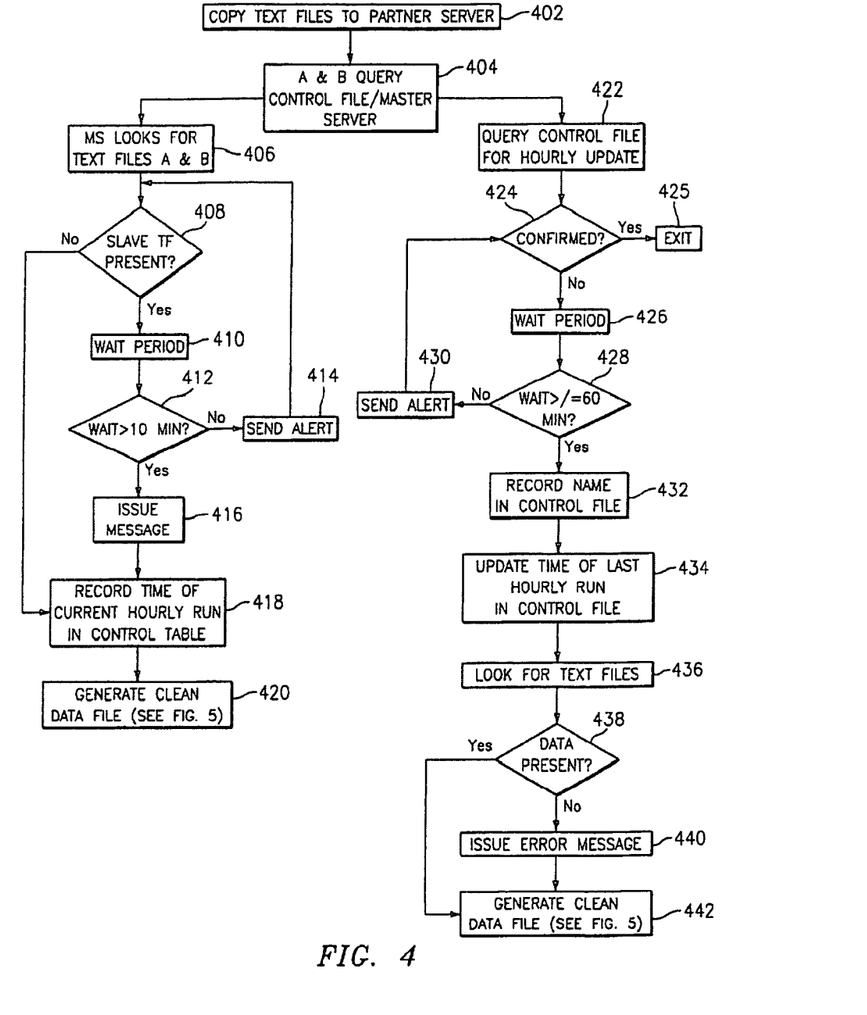
FIG. 4 is a flowchart describing the process of handling the redundant data of text files produced from via the data collection system in an exemplary embodiment.

FIG. 4 is a flowchart describing the process of handling the redundant data of text files produced from the method described in FIG. 3. At step 402, the text file 110 for a completed hourly run is copied over to server 102 and the text file 108 is copied over to server 106. Servers 102 and 106 query control table 116 to determine which server is the master server at step 404. This determination may be initially made by recording an identification of the preferred server in control table 116. Once this determination has been made, control of the data collection process preferably remains with the same server unless a failure or malfunction occurs. For purposes of illustration, the master server determined in step 402 is server A 102. Steps 406-420 represent actions taken by server 102 in its capacity as master server. Steps 422-430 represent actions taken by server 106 in its capacity as slave server. Steps 432-442 represent actions taken by server 106 upon taking control as master server.

At step 406, master server 102 checks for the existence of text files 108 and 110. If the data of the slave server text file 110 is present (e.g., all data was received from server 106), then master server 102 records the time of the current hourly run in control table 116 at step 418 and proceeds to generate a clean data file at step 420. If the data from slave server 106 is incomplete at step 408, master server 102 waits a predetermined time period (e.g., 30 minutes) at step 410 in order to give slave server 106 time to provide its data. Once the wait is more than 10 minutes or some similar predetermined time limit at step 412, an alert is generated and sent to network administrator client system 120 at step 414, and master server 102 continues to check to see if the data is received at step 408. Alerts continue to be sent periodically throughout the wait period. This waiting continues until the predetermined time limit has been reached at step 412, whereupon master server 102 issues a message to network administrator client system 120 that the data was never received from slave server 106 at step 416. Master server 102 then records the time of the current hourly run in control table 116 at step 418 in order to inform the slave server that it is updating database 112 and generates a clean data file utilizing the information in the text files 108 and 110, if present, at step 420. The time of the current hourly run is a nominal time indicating the time that the hourly run was scheduled, not necessarily the time that the hourly run was performed. The generation of a clean data file is described further in FIG. 5, while the computational process is further described in FIG. 6.

Upon determining that server 106 is the slave server at step 404, slave server 106 enters a loop waiting for master server 102 to update the time of the last hourly run in control table 116. Slave server 106 queries control table 116 to determine whether master server 102 recorded the hourly update at step 422. If the hourly update is confirmed at step 424, slave server 106 exits at step 425 because it knows that master server 102 will complete the computational process. If, however, the query reveals that an hourly update has not occurred at step 424, slave server 106 waits a predetermined amount of time (e.g. 60 minutes) at step 426 to allow master server 102 to update control table 116. Once the wait is more than 10 minutes or some predetermined time limit at step 428, slave server 106 periodically sends alerts to network administrator client system 120 at step 430 as notification that master server 102 has not updated control table 116. If the wait has reached sixty minutes at step 428 and no confirmation of the control table 116 hourly run update has been received, slave server 106 records its host name or identification in control table 116 at step 432 and updates the time of the last hourly run at step 434. The slave server 106 now assumes the role as master server. As the master server, server 106 checks for the existence of text files 108 and 110 at step 436 and determines if the data from server 102's text file 108 is present at step 438. If both data files are not present at step 438, server 106 issues an error message to network administrator client system 120 at step 440 and proceeds. Server 106 then generates a clean file for the hourly run at step 442 as described in FIG. 5.

As described in FIG. 1, lock file 115 is used by the data collection system in conjunction with control table 116 and locking mechanisms of database 112 to ensure that the currently hourly run has completed before the next hourly run is allowed to begin.

The master server generates a clean data file by comparing the two text files 108 and 110, filling in missing information, if any, and merging the data as described further in FIG. 5. At step 502 the local and remote data is sorted by port identification and then by time within each port. This transforms each hourly run text file into a number of small sections of data each of which contains the hour's data for one port. The data collection process starts with the initial sample gathered for the port from the local server. At step 504 the data collection system adds a designated time interval (e.g., 30,000 1/100ths of a second, or five minutes in the units of time used by the network device) to the time on the network device when that sample was gathered. This is the exact desired time of the next sample of five minutes (also referred to as "target network device time"). The data collection process examines the samples collected by the local and remote servers at step 506, and selects the one whose network device time most closely corresponds to the desired time at step 508. This process in steps 504-508 repeats until all data points in the text files have been processed at step 510 resulting in a clean text file. In this manner, the data collection process selects from the two streams of data a set of points whose times best approximate the desired five-minute intervals. This clean data file is then stored in a flat file in the master server that produced it at step 512. Delta values are computed at step 514 and appended to delta value table 118 at step 516. Steps 514 and 516 are described in further detail in FIG. 6.

The data collection system takes the clean data file from the master server and subtracts subsequent values for each port to compute delta values which are then appended to a delta value table in database 112. To minimize database table size, only the samples which have non-zero delta values are stored in the database 112. This automatically removes unused network ports from the recorded data and reduces table space to a manageable level. The last raw value table 119 contains the last raw data point that was used in a computation for each port being monitored. As indicated above, these values are also stored in the raw data files (text files) themselves so that these files can be processed in a stand-alone manner if necessary, in the event of a catastrophic system failure. In the delta computation process of FIG. 6, the previous values in last raw value table 119 in database 112 are used to insure that when the slave server has to take over, it continues the delta computation from the point where the previous master left off. Any data points in the new file that precede in time the values of those in delta value table 118 are automatically ignored. This provides the ability to store redundant points in the raw data files as well as to concatenate raw data files for ease of storage.

Figure 6:
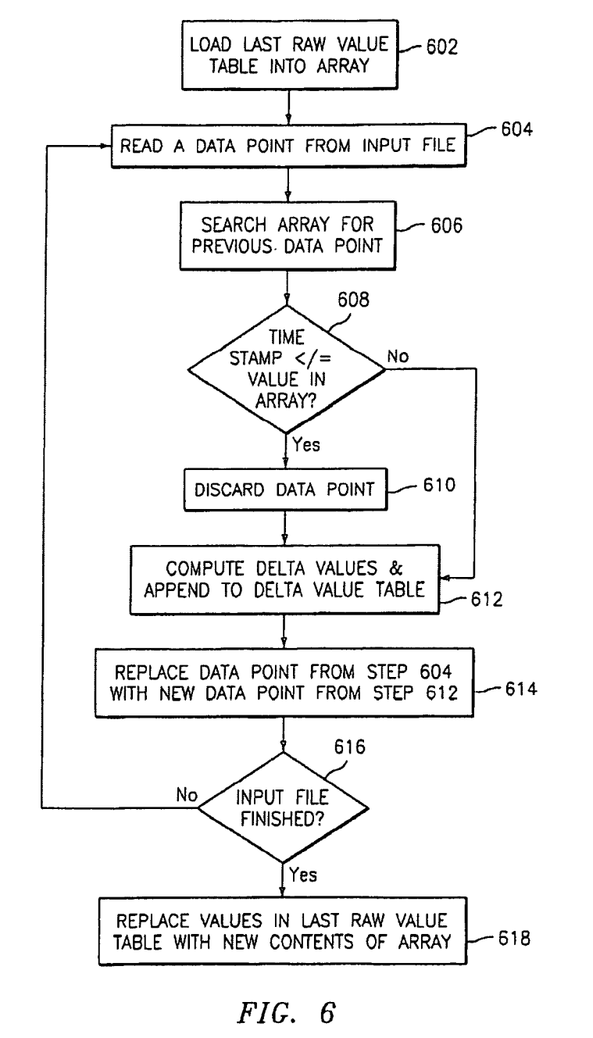
FIG. 6 is a flowchart describing the process of computing delta values for clean data files and computing bandwidth usage via the data collection system in an exemplary embodiment.

FIG. 6 describes how the data collection process computes the delta values for clean data files. Last raw value table 119 is loaded into an array at step 602. The data collection process reads a data point from the input file (text file) at step 604 and then searches the array for the previous data point for the same port at step 606. At step 608, it is determined whether the time stamp on the data point from the file is the same or earlier than the value in the array. If so, the data point is redundant and is discarded at step 610. If the time stamp is later than the value in the array, the delta values are computed and appended to delta value table 118 at step 612. The new data point from the file then replaces the value in the array to prepare for the next data point at step 614. This process repeats until all data points have been processed at step 616. After the input file has been completely processed at step 616, the new contents of the array replace the values in the last raw value table 119 so that the next hourly run can be processed at step 618.

As described in FIG. 4, the data collection process will issue error messages and alerts in the event that a problem is encountered. One drawback to these types of alerts is that if the process doesn't run at all no alerts are generated. To remedy this problem, an independent and distinct monitoring process is run continuously to ensure that data continues to be collected. The five-minute sampling process and the hourly computational run may be started by the UNIX "cron" process which allows the exact hour and minute when each process runs to be specified. The monitoring process may be run by the master UNIX process "init" with the "respawn" flag which ensures that the monitoring process will be restarted in the event it dies, provided that the UNIX server is operating. The conditions checked by the monitoring process may include:

it has been no longer than 1.5 time periods (1.5*5 minutes=7.5 minutes) since data has been stored in the raw local data file by the five-minute sampling process;

the remote data file has been set by the partner server if it is more than 10 minutes after the hour;

a connection to database 112 can be established;

log in attempts to database 112 are confirmed;

it has been no longer than 1.5 hours since the last hourly update run began; and if there is data in database 112 for a particular network device within the last 24 hours, or some other predetermined time period, then it has not been more than two hours since the last time data was received from that device; should contact be lost with a network device, it will be two hours before an entity takes action; once 24 hours have elapsed, however, it is assumed that the device has been deprovisioned and will stop generating alerts.

The redundant operations of the data collection system coupled with its other features, allows for greater accuracy in the capture of data so that backbone providers can increase their profits without adding a new service or a new customer. The data collection system gathers data in five-minute intervals every hour, processes it in real time, and delivers it to billing applications.

The data collection system tracks data from various types of SNMP-enabled devices and displays Web based reports. Network traffic can be viewed in near real time, whereby an administrator can work to resolve issues at the time they are detected. The redundant data sampling and alert system facilitates greater accuracy in data collection, which provides enhanced reliability in the organization's billing structure.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A computer program product, stored on a non-transitory computer medium, including instructions for:
    generating a clean data file by filling in data missing in a master text file using data from a slave text file, comprising:
        sorting, by a network device communicably coupled to a master server and at least one slave server, data in the master text file and the slave text file;
        sorting, by the network device, data samples by time of data collection; and
        for each of the data samples adding a designated interval of time to a time on the network device resulting in a target network device time, the time on the network device corresponding to a time the data sample was collected.

2. The computer program product of claim 1, wherein the master text file and the slave text file each comprise:
    a time on respective master and slave servers at which each of the data samples was gathered; and
    an identification of the network device.

3. The computer program product of claim 2, comprising computing delta values for the data samples in the clean data file, wherein computing the delta values comprising:
    for each data sample in the clean data file, subtracting a number of bytes for a data sample from a number of bytes for a preceding data sample resulting in a delta value;
    using the delta values from consecutive corresponding data samples in the clean data file to determine a number of bytes received by, and transmitted from, the network device between the data sampling time intervals; and
    updating the clean data file with results of the determination.

4. The computer program product of claim 3, comprising instructions for:
    for each data sampling run, defined by the data samples collected at predetermined time intervals, and over a predetermined time period, performing:
        querying a control table by the master server and the at least one slave server operable for determining which server assumes control over generating the clean data file; and
        querying the control table by the at least one slave server operable for determining whether the master server updated a current hourly run for a given text file.

5. The computer program product of claim 4, comprising instructions for, if the current hourly run has not been updated upon reaching a predetermined time limit, updating the control table with an identification of a slave server and a current hourly run by the slave server, wherein the updating the control table is operable for notifying the master server that control is transferred to the slave server.

6. The computer program product of claim 1, wherein the master text file and the slave text file each comprise:
    a number of bytes received on the network device for each of the data samples; and
    a time on the network device at which the number of bytes was received.

7. The computer program product of claim 1, wherein the master text file and the slave text file each comprise:
    a number of bytes transmitted on the network device for each of the data samples; and
    a time on the network device at which the number of bytes was transmitted.

8. The computer program product of claim 1, comprising instructions for producing the master text file via the master server, wherein producing a master text file by the master server and producing a slave text file by the at least one slave server comprises:
    scanning a recently completed master text file for a final sampled value and recording the final sampled value in a subsequent text file for the master server;
    using the final sampled value to concatenate consecutive master text files; and
    discarding the final sampled value if its time of collection exceeds a designated time limit.

9. The computer program product of claim 1, comprising instructions for producing the slave text file via the at least one slave server, wherein producing a slave text file by the at least one slave server comprises:
    scanning a recently completed slave server text file for a final sampled value and recording the final sampled value in a subsequent text file for the at least one slave server;

using the final sampled value to concatenate consecutive slave text files; and discarding the final sampled value if its time of collection exceeds a designated time limit.

10. The computer program product of claim 1, comprising instructions for examining data samples in the master text file and the slave text file that correspond to the time the respective data samples was collected.

11. The computer program product of claim 1, comprising instructions for selecting from one of the master text file and the slave text file the data sample with a collection time most closely matching the target network device time.

12. The computer program product of claim 1, comprising instructions for storing the selected data sample in the clean data file.

13. A computer application, that, when executed by a processor in a computer:

generates a first text file from a first server and generates a second text file from a second server wherein the first server and the second server are communicably coupled to a network device;

compares the first text file with the second text file to determine data contained in the second text file and not contained in the first text file;

creates a third text file comprising contents of the first text file supplemented with data contained in the second text file and not contained in the first text file; and adds a first interval of time to the first time on a network device for each collection of text files wherein the result comprises a target network device time.

14. The computer application of claim 13, wherein the first server and the first text file are authoritative and wherein the second server and the second text file become authoritative upon a failure detected at the first server.

15. The computer application of claim 13, wherein the third text file is a clean data file and receives data samples at each occurrence of the target network device time and wherein data samples are selected from one of the first text file and the second text file based on collection times most closely matching the target network device time.

16. The computer application of claim 13, wherein the first text file and the second text file each comprise a first quantity of bytes received on the network device and a second quantity of bytes transmitted on the network device for each of the data samples and times on the network device at which the first quantity of bytes was received and the second quantity of bytes was transmitted.

17. The computer application of claim 13, wherein the computer application:

subtracts a quantity of bytes for a data sample in the clean data file from a number of bytes for a preceding data sample, wherein the result is a delta value;

determines a number of bytes received by the network device between the data sampling time intervals;

determines a number of bytes transmitted by the network device between the data sampling time intervals; and records the results of the determinations in the clean data file.

18. The computer application of claim 13, wherein the application scans a recently completed first text file for a final sampled value, records the final sampled value in a subsequent first text file, and uses the final sampled value to concatenate consecutive first text files, wherein the final sampled value is discarded if its time of collection exceeds a designated time limit.

19. The computer application of claim 13, wherein the computer application is one of stored on a non-transitory medium in the computer and provided electronically over a transmission medium and wherein the data collected on the network device is bandwidth data associated with the simple network management protocol (SNMP).

20. A method, comprising:

generating a first text file from a first server and generating a second text file from a second server wherein the first text file and the second text file collect data samples from a network device;

generating a clean data file by adding data missing from the first text file using data from the second text file;

querying a control table for a data sampling run to determine which server controls data computation activities, the activities comprising generating the clean data file;

querying the control table to determine whether the first server updated a current run for a given text file;

determining from the query of the control table that the current run has not been updated by the first server upon reaching a predetermined time limit; and updating the control table with an identification of the second server and a current run by the second server wherein updating the control table notifies the first server that control is transferred to the second server.

* * * * *